United States Patent [19]
Bauman et al.

[11] 3,848,552
[45] Nov. 19, 1974

[54] SEED DISPENSER FOR PLANTERS

[76] Inventors: Jack L. Bauman, 210 Robin Hill; Vedrick A. Erickson, 865 S. Wright St., both of Naperville, Ill. 60540

[22] Filed: Apr. 27, 1973

[21] Appl. No.: 354,968

Related U.S. Application Data

[62] Division of Ser. No. 162,091, July 13, 1971, Pat. No. 3,762,603.

[52] U.S. Cl. .................. 111/77, 221/211, 221/278
[51] Int. Cl. ........................................... A01c 23/02
[58] Field of Search ............... 111/77; 221/211, 278

[56] References Cited
UNITED STATES PATENTS

| | | | |
|---|---|---|---|
| 2,605,017 | 7/1952 | Bolen | 221/278 X |
| 3,482,735 | 12/1969 | Goulter | 111/77 X |
| 3,693,833 | 9/1972 | Weitz | 221/211 |
| 3,698,332 | 9/1970 | McCallum | 111/77 |

Primary Examiner—Stephen C. Pellegrino
Attorney, Agent, or Firm—F. David AuBuchon; Floyd B. Harman

[57] ABSTRACT

A pneumatic seed dispenser assembly mounted on a traveling frame, comprising in a compact longitudinal alignment centrally of the frame, a seed hopper, an air blower and a rotary seed selector drum sharing a common wall with the blower and receiving air under pressure therefrom. Seed is fed from the hopper to the drum by a seed delivery tube which is disposed below the blower and connected at one end to the drum and at its other end to a hopper discharge outlet which is laterally displaced from the center of the hopper.

8 Claims, 4 Drawing Figures

PATENTED NOV 19 1974

SEED DISPENSER FOR PLANTERS

This is a division, of application Ser. No. 162,091, filed July 13, 1971, now U.S. Pat. No. 3,762,603.

CROSS REFERENCES TO RELATED APPLICATIONS

U.S. application to Loesch, et al, Ser. No. 836,480, filed June 25, 1969, now U.S. Pat. No. 3,637,108 U.S. Application to Lienemann, Ser. No. 146,258, filed May 24, 1971, U.S. application to Lienemann et al, Ser. No. 169,960, filed Aug. 9, 1971, now U.S. Pat. No. 3,757,996, and U.S. application to Bauman, Ser. No. 162,090, filed July 13, 1971, now U.S. Pat. No. 3,779,428.

BACKGROUND OF THE INVENTION

1. Field of the Invention

This invention relates to dispensers and particularly to planters. More specifically, the invention concerns a planter of the pneumatic type.

2. Description of the Prior Art

Planters of the pneumatic type utilizing air pressure differential in a rotatable seed selector to retain seed at a pickup opening by vacuum or by pressure greater than atmospheric and discharge the seed after a predetermined rotation of the selector by vacuum release or by positive air pressure, are known. Planters of this type are shown for example in the U.S. Pats. to: Dodwell, No. 2,960,258 of Nov. 15, 1960; Clow, No. 3,240,175 of Mar. 15, 1966; Winter, No. 3,142,274 of July 28, 1964; and Ferrault, No. 3,412,908 of Nov. 26, 1968. Such planters have been cumbersome, and the relationship of the seed source to the seed selector or metering device has caused inefficient and ununiform delivery of seed thereto with consequent failure to fill all of the seed pickup openings. Furthermore, the haphazard relationship of the air pump or blower to the seed selector has been accompanied by air losses resulting in abnormally high power requirements for operating the blower, impairing the efficiency of the pickup openings in the seed selector to attract and retain a seed and carry it to the discharge area, and to discharge the seed to the furrow openers.

SUMMARY OF THE INVENTION

Under optimum conditions each of a plurality of seed pickup openings in a pneumatic seed selector of the type with which this invention is concerned will attract and hold a single seed and will successively discharge to the ground single seeds at uniform intervals. However, prior planters have, due to the disadvantages referred to, retained more than one seed in a pickup opening or have failed to fill all of the openings and to discharge the seeds uniformly.

Therefore, the present invention contemplates the provision of a dispenser assembly for a planter wherein the interacting components are advantageously arranged in a compact unit to feed seed from a hopper to the interior of a seed selector drum having peripheral openings therein and to deliver air under pressure from a blower to the drum to seat seed in the openings and to discharge the seed to the planter furrow openers. The dispenser assembly comprises a support structure mounted on the planter frame which supports the seed hopper centrally of the frame. Rearwardly of the hopper and closely adjacent thereto the support structure carries an air pump or blower having a rear wall on which is rotatably mounted the selector drum, said rear wall of the blower forming a common wall with the drum. The components of the dispenser assembly are thus closely associated and combine to achieve maximum efficiency in feeding seed to the selector drum with minimum loss of air pressure from the blower.

An object of the invention is the provision, in an improved seed dispenser of the pneumatic type wherein a rotary seed selector is revolved in the presence of a supply of seed which is fed to the selector from a seed hopper in close association therewith, the seed being received and held in openings in the periphery of the selector during a predetermined rotation thereof and discharged by air under pressure supplied by an air blower in close association with the hopper and the selector.

Another object of the invention is the provision, in a planter of the pneumatic type having a mobile supporting frame carrying a plurality of furrow openers, of a seed dispenser assembly centrally disposed on the planter frame and including a seed hopper, an air blower and a rotatable seed selector having a connection to the hopper and to the blower to receive seed and air under pressure, respectively, therefrom and to discharge the seed by high pressure air to the furrow openers.

DESCRIPTION OF THE PREFERRED EMBODIMENT

Figure 1:
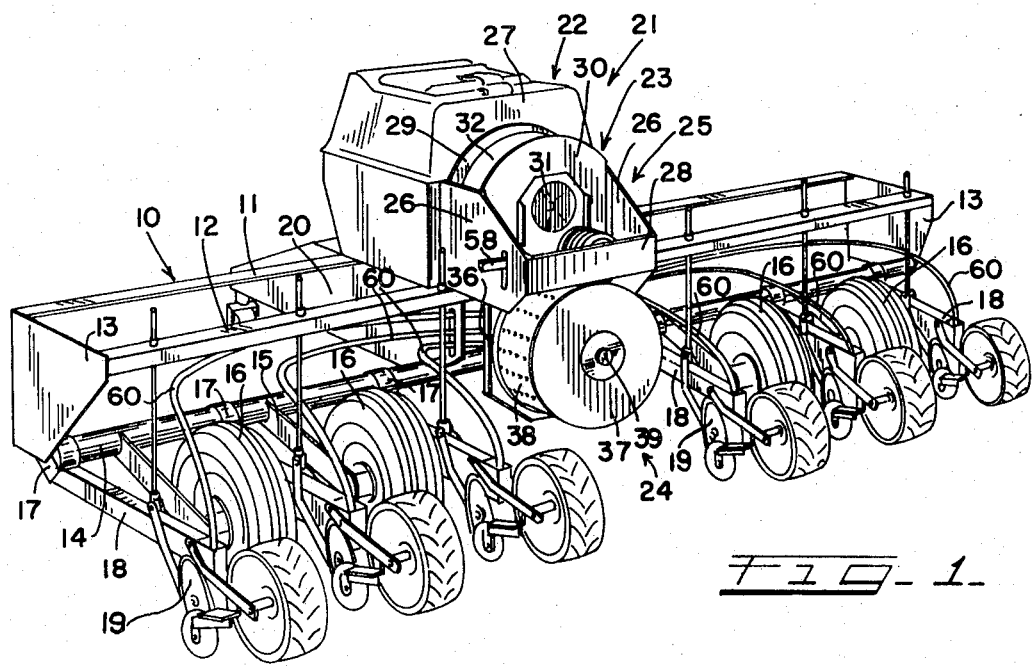
FIG. 1 is a perspective view of a trailbehind planter adapted for connection to a tractor and having mounted thereon a pneumatic seed dispenser assembly incorporating the features of this invention.

The planter shown in FIG. 1 comprises a rectangular frame 10 including front and rear angle bars 11 and 12, respectively, and end plates 13, rotatably supporting the ends of a shaft 14 to which are affixed rearwardly extending arms 15 upon the ends of which are mounted wheels 16. Shaft 14 also carries a plurality of brackets 17 to which are pivotally connected the forward ends of drag links 18, upon which are mounted furrow opener units 19.

A hitch structure 20 is secured to and extends forwardly from the planter frame and is adapted for connection to a tractor of any well known type, not shown, having a power take-off shaft.

A seed dispenser assembly generally designated by the numeral 21 is carried by the planter frame and comprises a seed hopper 22, an air pump or blower 23 and a seed selector drum 24, disposed in a vertical plane extending longitudinally of the direction of travel of the planter. The dispenser assembly is mounted on the planter frame by a supporting structure 25 comprising laterally spaced side plates 26 extending in the direction of travel and affixed to the central portion of the planter frame.

Seed hopper 22 is mounted between the forward ends of plates 26, and the housing for blower 23 is mounted between the side plates 26 adjacent but spaced somewhat from the rear wall 27 of the hopper. The rear ends of side plates 26 of the dispenser support are connected by a transverse brace 28.

Blower 23 comprises a forward wall 29 and a rear wall 30 having an opening 31 therein and connected to the forward wall by a closure member 32. The housing encloses a fan or vaned member 33, mounted on a shaft 34 extending in the direction of travel in longitudinal alignment with the seed hopper, and at one side the closure 32 communicates with a downwardly and rearwardly directed air discharge tube 35.

Walls 29 and 30 of the blower are provided with flanges 36 by which the blower is secured to the sides 26 of the supporting structure 25, and rear wall 30 of the blower extends vertically downwardly to form a stationary supporting member and forward wall for the seed selector drum 24. Drum 24 includes an outer or rear wall 37 and a cylindrical peripheral portion 38, and is driven in the direction of the arrow in FIG. 3 by a shaft 39. Shaft 39 is rotatably mounted in the forward stationary wall 30 about an axis parallel to and generally in the same vertical plane as the axis of blower shaft 34, and its rear end is secured to outer wall 37 of the drum.

Figure 2:
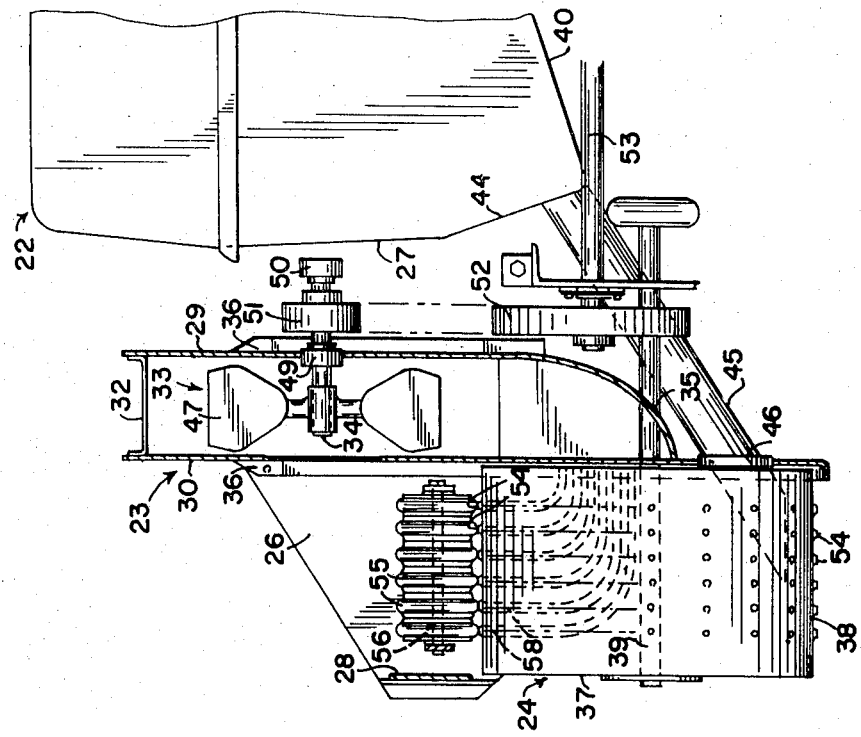
FIG. 2 is a view in side elevation, with parts removed, of the dispenser assembly shown in FIG. 1.

As shown in FIG. 2, the hopper bottom 40 slopes downwardly from front to rear. Also as viewed from the rear in FIG. 3, the hopper bottom 40 slopes laterally inwardly to form a relatively long bottom portion 41 and a relatively short portion 42 converging at a location laterally removed from the longitudinal center line of the hopper and of the blower and seed selector drum. A discharge outlet 43 is formed in the lower portion 44 of rear wall 27 of the hopper, as indicated in FIG. 2.

Seed discharge outlet 43 is connected to the upper end of a tubular guide member or chute 45 which is directed downwardly and rearwardly, and diagonally inwardly below the blower and the drum shaft 39, and is connected to an opening 46 in the lower portion of the stationary forward wall 30 of the drum. Seed flows from the hopper 22, through chute 45 and into drum 24 to form a seed supply in the bottom thereof.

Figure 3:
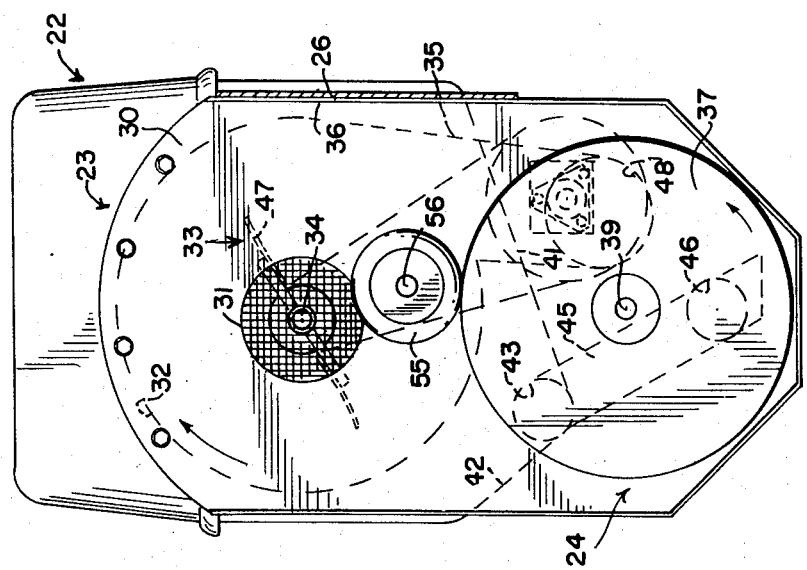
FIG. 3 is a rear view of the assembly shown in FIG. 2.

Blower fan 33 mounted on shaft 34 comprises vanes 47 curved at their outer ends into the direction of rotation and, as indicated in FIG. 3, air discharge tube 35 delivers air under pressure to the drum through an opening 48 in the stationary wall 30.

Fan drive shaft 34 is rotatable in a bearing 49 carried by wall 29 and its forwardly projecting end is supported in a bearing 50 carried by the planter frame. A pulley 51 mounted on shaft 34 is driven from a larger pulley 52 mounted on a shaft 53 receiving its drive in any suitable manner, not shown, from the power take-off shaft of the tractor by which the implement is propelled.

Drum drive shaft 39 extends forwardly and is revolved in the opposite direction from the blower by suitable gearing, in a manner not shown, from one of the ground engaging wheels 16.

The construction and operation of the seed selecting and discharge mechanism within the drum 24 form, per se, no part of the present invention. Reference is hereby made to the above mentioned application to Loesch, et al, for a complete disclosure of the seed selecting mechanism. It will suffice for an understanding of the subject invention to note that the periphery 38 of the drum is provided with circumferentially spaced rows of seed-receiving openings 54 and individual seeds filling the openings are held there by the pressure differential between external atmospheric and the high pressure air introduced into the drum.

Seed picked up by the openings 54 from the seed supply in the bottom of the drum is carried upwardly in the direction of drum rotation indicated by the arrow in FIG. 3 to a location near the top of the drum where the seed is released.

Figure 4:
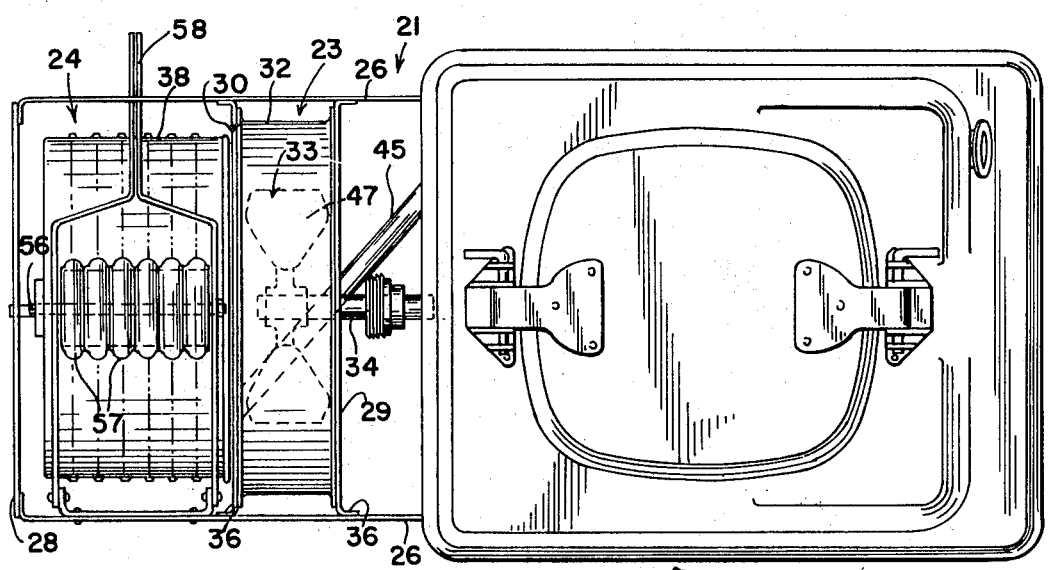
FIG. 4 is a plan view of the structure shown in FIG. 2.

Release of the seed from the openings 54 is caused by the provision of a series of rollers or wheels 55, preferably made of rubber, rotatably mounted on a shaft 56 carried by a fork 57, shown in FIG. 4. Fork 57 is pivotally connected to one of the supports 26 and has an arm 58 projecting through a slot provided in the other supporting plate 26 to accommodate raising the rollers, out of engagement with the drum. As the outer edges of openings 54 successively move into engagement with the rollers 55 the pressure differential between the inside and outside of the seed openings is negative and the seeds are released.

High pressure air from the drum flows through the discharge tubes 58 and carries the released seeds along with it. The discharge tubes which are directed downwardly and forwardly of the direction of travel, as shown in FIG. 2, extend through suitable apertures provided in the forward wall 30 of the drum and are connected, in a manner not shown, to seed guide tubes 60. As indicated in FIG. 1, seed guide tubes 60 extend laterally from the selector drum and carry the seed to the furrow opener units 19.

The combination and arrangement of the seed dispensing components of this invention herein described efficiently and economically meters seed supplied from a hopper carried by a mobile planter and discharges the seed to the furrows formed by the planter furrow openers at regular intervals and with a minimum expenditure of power, and the construction and operation thereof should be clearly understood from the foregoing description.

The embodiments of the invention for which an exclusive property or privilege is claimed are defined as follows:

1. In a planter, a transversely elongated traveling frame having spaced furrow openers thereon, a seed dispenser assembly comprising a seed hopper centrally mounted on the frame having a seed discharge outlet in its bottom, an air blower mounted on the frame adjacent the hopper, a supporting member carried by said frame and extending below said blower, said supporting member having a first and a second surface, a drive shaft rotatably mounted in said supporting member vertically spaced from the blower, and a seed selector drum mounted on said drive shaft adjacent said first surface of said supporting member, said supporting member having openings therein communicating through a chute and a tube protruding from said second surface with said discharge outlet and said blower respectively to direct seed and air under pressure respectively to the interior of the drum.

2. The invention set forth in claim 1, wherein said drum has a peripheral portion having seed-receiving openings therein and an outer wall secured to said drive shaft, and wherein said first surface of the supporting member forms the inner wall of said drum.

3. The invention set forth in claim 2, wherein said supporting member is a downward extension of one wall of said blower.

4. The invention set forth in claim 3, wherein seed guide tubes extend from the interior of the drum to said furrow openers and said inner wall of the drum is apertured to receive said tubes.

5. The invention set forth in claim 4, wherein said discharge outlet in the hopper is laterally removed from the longitudinal center line of the hopper and wherein said chute is a tubular member extending downwardly and diagonally rearwardly and inwardly for connection to the drum at a location below the axis of the latter.

6. In a planter, a transversely elongated traveling frame having spaced furrow openers thereon, a seed dispenser assembly comprising a dispenser support structure centrally mounted on the planter frame and extending longitudinally of the direction of travel, a seed hopper carried by said support structure having a seed discharge outlet in its lower portion, an air blower housing mounted on said support structure in generally longitudinal alignment with the hopper and having spaced walls, one of said walls having a vertical extension, an opening formed in said vertical extension, a seed selector drum rotatably mounted on said extension such that said opening is in communication with the interior of said seed selector drum and means providing communication between the discharge outlet in the hopper and the interior of the drum and between the blower and the interior of the drum to direct seed and air under pressure respectively to the drum.

7. The invention set forth in claim 6, wherein said drum has an outer wall and a peripheral portion having seed-receiving openings therein and said vertical extension forms an inner stationary wall for the drum.

8. The invention set forth in claim 7, wherein a drive shaft is rotatably mounted in said stationary wall and is secured to the outer wall of the drum.

* * * * *

UNITED STATES PATENT OFFICE
CERTIFICATE OF CORRECTION

Patent No. 3,848,552  Dated  November 19, 1974

Inventor(s)  Jack L. Bauman et al

It is certified that error appears in the above-identified patent and that said Letters Patent are hereby corrected as shown below:

Title page, under inventors' names, insert:

Assignee: International Harvester Company
Chicago, Illinois

Signed and sealed this 11th day of February 1975.

(SEAL)
Attest:

RUTH C. MASON
Attesting Officer

C. MARSHALL DANN
Commissioner of Patents
and Trademarks